Patented Mar. 5, 1946

2,395,895

UNITED STATES PATENT OFFICE 2,395,895

METHOD OF PREPARING COATING COMPOSITION

William F. May, Maywood, Ill., assignor to American Can Company, New York, N. Y., a corporation of New Jersey No Drawing. Application March 19, 1942, Serial No. 435,427

1 Claim. (Cl. 260—42)

The present invention relates to a no-solvent coating material for a metallic can body and has particular reference to a material which is a homogeneous mixture of two compatible resins derived from hydrocarbon polymers, prepared by milling and without any solvents or softeners and producing a coating which requires no baking or drying heat after its application to the can body surface, thus adapting it to the coating of formed can bodies as well as to other purposes.

Sheet metal containers which are used for containing foods are made usually from tin plate which provides a tin coated surface on both the outside and the inside of the can. In manufacturing the can body its side seam is formed usually with lock and lap sections which subsequently are soldered. In the bending of the metal incident to the formation of the side seam, the tin surface on the inside of the can often is broken or otherwise damaged adjacent the seam area so that certain food products react with the metal base exposed by the disturbed tin lining and cause corrosion. Such corrosion sometimes takes place at the side seam even when the tin surface has been protected further by an interior lining since during the seam forming operation both tin and lining may be disturbed at the side seam.

The inner surfaces of can bodies heretofore have been stripe coated with protective linings and the vulnerable side seam area has been covered by such a stripe coat. An example of this is shown in the W. E. Taylor United States Patent No. 2,178,618. The coating material of the present invention, to cite merely one example of use, can be employed in a similar manner if desired and is superior to the Taylor stripe coating for certain products in that it is prepared without any solvents and is applied to the seam area in a heated condition, whereupon it sets immediately without the need of a bake or any further curing step.

A great number of processed food products require processing heat of 212 degrees F. or lower. The coating material of the present invention when applied to the inside surface of a can containing such food products will not be disturbed by this relatively low processing heat. Obviously such a temperature will not disturb the solder or other bonding medium at the side seam.

The present invention contemplates the avoidance of corrosion difficulties of cans for those food products which require processing temperatures not in excess of 212 degrees F. and which also require that the inner surface of the can particularly at the side seam be protected against a product coming into contact with the steel base metal of the can body.

An object of the present invention is the provision of a coating material consisting of a homogeneous mixture of compatible hydrocarbon resins which are milled together to provide a coating finally adaptable for forming a continuous lining for all or a part of the can body inner surface to which it is applied and which need not be baked or cured.

Numerous other objects and advantages of the invention will be apparent as it is better understood from the following description which is of a preferred embodiment thereof.

The coating material formula hereinafter given as an example of one embodiment of the present invention shows a new use for compatible hydrocarbon resins which when properly combined without the use of solvents or other softening agents provide a surface covering material which will possess the desired characteristic.

The coating or lining material of the present invention consists of two compatible hydrocarbon resins which may be milled together and brought to a coating viscosity without the use of any other materials. Such mixture comprises a rubber-like, high molecular weight, polymer of isobutene and a clear water-white or prime-white viscous or solid cycloparaffin resin derived from a hydrogenated coumarone-indene type resin and having a melting point range of from 145 degrees C. to 155 degrees C. Preferably, one part of the polybutene is combined with three parts of the other resin. This percentage may be varied to provide for a coating material having more or less flexibility.

A linear polybutene also known as a rubber-like, high molecular weight polymer of isobutene which is satisfactory for the present purpose is made by Advance Solvents and Chemical Corporation of New York city and is sold under the trade name of "Vistanex Medium." A suitable resin for the second part of the mixture is made by the Neville Company of Pittsburgh, Pa., and is sold under the trade name of "Nevillite No. 1."

"Vistanex" is the name given to a series of high molecular weight hydrocarbon polymers whose physical consistency is governed largely by their molecular weight. Chemically "Vistanex" is considered to consist of linear polymers with a negligible degree of unsaturation. "Vistanex Medium" is one of this series and is a tough, dry, elastic, rubbery resin, similar to white crepe rubber in appearance. "Vistanex" is chemically resistant to most acids, alkalies and salts, is odorless and nontoxic.

Chemically, "Nevillite No. 1" may be described as a cycloparaffin, or naphthene polymer. This cycloparaffin is derived from the hydrogenation of coumarone-indene type resin. "Nevillite No. 1" contains no esters and is consequently unsaponifiable; its acid number is negligible (about .35) and its unsaturation as indicated by iodine number is quite low, the iodine number ranging from 30 to 45. Its compatibility is limited, but it is compatible with "Vistanex" and it was discovered that it is compatible especially with "Vistanex Medium" for the specific objective of the present invention. It is permanently thermoplastic, waterwhite, tasteless and nontoxic.

In preparing a suitable mixture of Vistanex and Nevillite resins, for example, for the average stripe or other surface coating of cans suitable for products requiring a processing temperature not in excess of 212 degrees F., the following procedure may be used. The desired quantity of Vistanex is put into an ordinary rubber mill with cold rolls and the Vistanex is worked for about one hour or until the resin is broken down so that a smooth sheet is obtained on the rolls.

The Nevillite resin in the meantime has been powdered and this now is added slowly to the milling Vistanex and it will require approximately one to two hours in which to add all of the Nevillite resin, the quantity used being substantially three times that of the Vistanex. A suitable milling action may be obtained during this procedure if the mill is maintained at a temperature of from 100 degrees F. to 140 degrees F.

After all of the Nevillite has been added better results may be obtained by raising the temperature of the milling rollers to about 200 degrees F. and with this temperature the mixture is further milled for about one half hour. The resulting product may be allowed to cool and may be stored until its use.

In applying the stripe coating, for example, to the side seam of a can body, it is merely necessary to heat the coating material until it becomes sufficiently plastic or liquid so that it can be brushed or flowed onto the can surface to be covered. After application the film sets without the necessity of a baking or other curing step and thereafter provides a satisfactory coating for the body wall. After the product has been sealed in a can having such a lining a subsequent processing temperature of 212 degrees F. or less will not affect the coated film.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

The method of preparing a coating composition which has high chemical and corrosion resistance for application to the surfaces of sheet metal containers, which method comprises the steps of milling together, without the use of solvents or softeners, three parts by weight of a waterwhite, unsaponifiable and substantially non-acidic cycloparaffine resin derived from the hydrogenation of indene and coumarone resins and having a melting point range of from 145 degrees centigrade to 155 degrees centigrade and one part by weight of a compatible, rubber-like, high molecular weight polymer of isobutene, said milling being accomplished at a temperature of from 100 degrees Fahrenheit to 200 degrees Fahrenheit and for a time sufficient to obtain a homogeneous mixture of high viscosity, then heating said mixture to lower its viscosity to a point where it may be applied to said surfaces in heated condition.

WILLIAM F. MAY.